US012752707B2

(12) United States Patent
Baur

(10) Patent No.: US 12,752,707 B2
(45) Date of Patent: Oct. 6, 2026

(54) VEHICULAR REVERSING ASSIST SYSTEM WITH ADJUSTABLE REAR BACKUP CAMERA

(71) Applicant: Magna Mirrors of America, Inc., Holland, MI (US)

(72) Inventor: Michael J. Baur, Kentwood, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 171 days.

(21) Appl. No.: 18/624,340

(22) Filed: Apr. 2, 2024

(65) Prior Publication Data

US 2024/0336200 A1 Oct. 10, 2024

Related U.S. Application Data

(60) Provisional application No. 63/494,779, filed on Apr. 7, 2023.

(51) Int. Cl.
*B60R 1/26* (2022.01)
*B60R 11/04* (2006.01)

(52) U.S. Cl.
CPC ................ *B60R 1/26* (2022.01); *B60R 11/04* (2013.01); *B60R 2300/101* (2013.01)

(58) Field of Classification Search
CPC .. B60R 1/26; B60R 1/28; B60R 11/04; B60R 2011/004; B60R 2300/101
See application file for complete search history.

(56) References Cited

U.S. PATENT DOCUMENTS

| | | | |
|---|---|---|---|
| 4,896,136 | A | 1/1990 | Hotovy |
| 5,550,677 | A | 8/1996 | Schofield et al. |
| 5,670,935 | A | 9/1997 | Schofield et al. |
| 5,949,331 | A | 9/1999 | Schofield et al. |
| 6,077,576 | A | 6/2000 | Osborn |
| 6,086,230 | A | 7/2000 | Wooldridge et al. |
| 6,409,367 | B1 | 6/2002 | Pratt |
| 6,416,209 | B1 | 7/2002 | Abbott |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,801,245 | B2 | 8/2014 | De Wind et al. |
| 8,917,437 | B2 | 12/2014 | Baur et al. |
| 9,896,026 | B2 | 2/2018 | Snider |
| 10,155,474 | B2 | 12/2018 | Salter et al. |
| 10,501,008 | B2 | 12/2019 | Snider |

(Continued)

*Primary Examiner* — Adam R Mott
*Assistant Examiner* — Abigail Lee Espinoza
(74) *Attorney, Agent, or Firm* — HONIGMAN LLP

(57) ABSTRACT

A vehicular vision system includes a camera disposed at a tailgate of a vehicle. The system, via processing at an electronic control unit (ECU) of image data captured by the camera, generates video images that are displayed at a display device at an interior portion of the vehicle. The tailgate is pivotable between a closed position and an opened position. When the tailgate is in the closed position, the camera views rearward of the vehicle, and when the tailgate is pivoted to the opened position, the camera pivots relative to the tailgate to view rearward of the vehicle with the tailgate in the opened position. The system controls an actuator to pivot the camera relative to the tailgate to adjust a rearward view of the camera based on processing at the ECU of image data captured by the camera.

25 Claims, 2 Drawing Sheets

(56) References Cited

U.S. PATENT DOCUMENTS

| | | | |
|---|---|---|---|
| 10,604,064 | B2 | 3/2020 | Kuhl et al. |
| 10,800,320 | B2 | 10/2020 | Sobecki |
| 2005/0046696 | A1 | 3/2005 | Lang et al. |
| 2007/0274087 | A1 | 11/2007 | Herold |
| 2009/0129112 | A1 | 5/2009 | Shamitz et al. |
| 2010/0328644 | A1* | 12/2010 | Lu .......... H04N 23/57 356/5.01 |
| 2011/0211362 | A1 | 9/2011 | Heiden et al. |
| 2012/0118719 | A1 | 5/2012 | Harrop et al. |
| 2014/0198515 | A1 | 7/2014 | Tulio et al. |
| 2014/0313339 | A1* | 10/2014 | Diessner .......... H04N 7/18 348/148 |
| 2014/0320823 | A1 | 10/2014 | Ammar et al. |
| 2015/0002670 | A1* | 1/2015 | Bajpai .......... G06V 20/56 348/148 |
| 2015/0043231 | A1 | 2/2015 | Clark |
| 2015/0198300 | A1 | 7/2015 | Huebner et al. |
| 2015/0217685 | A1 | 8/2015 | Salter et al. |
| 2015/0224919 | A1 | 8/2015 | Sobecki et al. |
| 2016/0001700 | A1 | 1/2016 | Salter et al. |
| 2016/0006922 | A1* | 1/2016 | Boudreau .......... H04N 23/661 348/207.1 |
| 2016/0167568 | A1 | 6/2016 | Salami, Jr. |
| 2017/0238277 | A1 | 8/2017 | Irgang et al. |
| 2017/0246985 | A1 | 8/2017 | Dellock et al. |
| 2017/0274940 | A1 | 9/2017 | Povinelli et al. |
| 2018/0001820 | A1* | 1/2018 | Higgins .......... B62D 33/0273 |
| 2018/0281674 | A1 | 10/2018 | Iseki et al. |
| 2019/0032374 | A1 | 1/2019 | Linden et al. |
| 2019/0106051 | A1 | 4/2019 | Huizen et al. |
| 2019/0106053 | A1 | 4/2019 | Chen |
| 2019/0309564 | A1 | 10/2019 | Mitchell et al. |
| 2020/0094736 | A1 | 3/2020 | Augusty |
| 2020/0114807 | A1* | 4/2020 | Sobecki .......... B60Q 1/2669 |
| 2022/0258670 | A1* | 8/2022 | Hanchett .......... H04N 23/69 |
| 2023/0097232 | A1* | 3/2023 | Tobie .......... H04N 23/51 348/148 |

* cited by examiner

VEHICULAR REVERSING ASSIST SYSTEM WITH ADJUSTABLE REAR BACKUP CAMERA

CROSS REFERENCE TO RELATED APPLICATION

The present application claims the filing benefits of U.S. provisional application Ser. No. 63/494,779, filed Apr. 7, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driving assistance system or vehicular vision system or vehicular imaging system for a vehicle utilizes one or more cameras (preferably one or more CMOS cameras) to capture image data representative of images exterior of the vehicle. The vehicular vision system includes one or more cameras disposed at a tailgate of the vehicle. As the tailgate moves between a closed position and an opened position along a downward swing path, the camera pivots relative to the tailgate so as to view rearward of the vehicle when the tailgate is in the closed position and when the tailgate is in the opened position. Thus, rear backup video images may be displayed to the driver of the vehicle with the tailgate in the closed position and with the tailgate in the opened position. Further, the vehicular vision system may operate an electrically operable actuator to pivot the camera relative to the tailgate to adjust an angle of a principal viewing axis of the camera relative to the tailgate based on processing at an electronic control unit (ECU) of image data captured by the camera. For example, the vehicular vision system may pivot the camera so that the angle of the principal viewing axis relative to a ground surface with the tailgate in the opened position is within 10 degrees or 5 degrees or less of when the tailgate is in the closed position. Optionally, the vehicular vision system may pivot the camera relative to the tailgate so that the image data captured by the camera includes an end or edge of an object detected in the captured image data.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
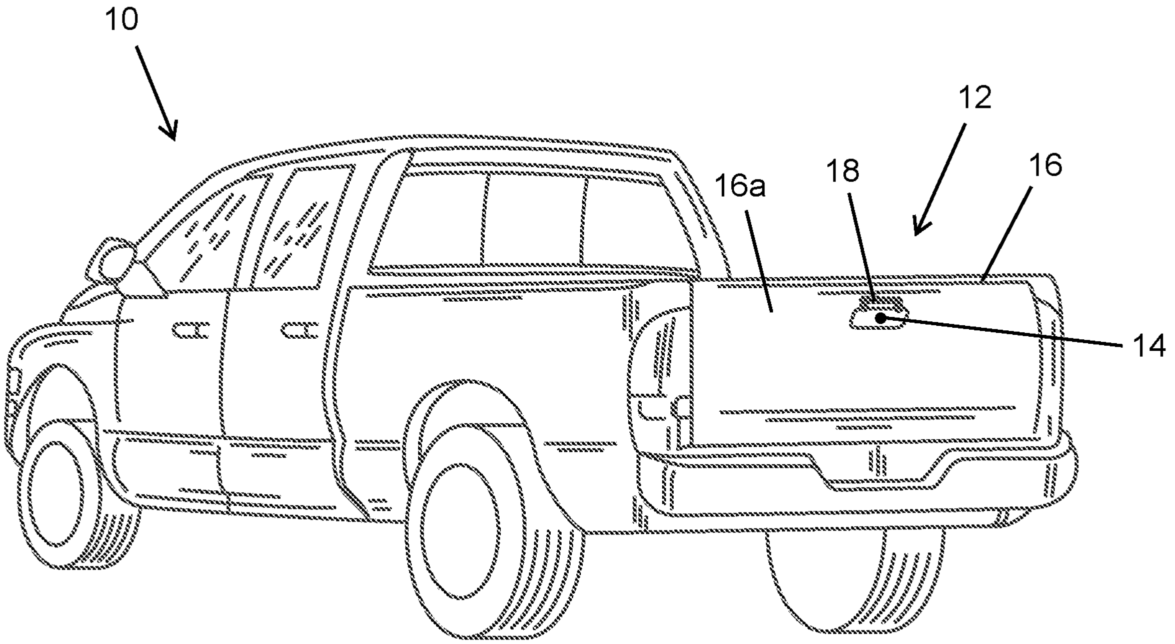
FIG. 1 is a rear perspective view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14 (and the system may optionally include multiple exterior viewing imaging sensors or cameras, such as a forward viewing camera at the front (or at the windshield) of the vehicle, and a sideward/rearward viewing camera at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

As shown in FIG. 1, the vehicle 10 may comprise a pickup truck having a tailgate 16 that is movable between a raised or closed position (FIG. 1), where the tailgate 16 extends substantially vertically at the rear of a bed or compartment or cargo area of the pickup truck to close the bed, and a lowered or opened position (not shown), where the tailgate 16 is pivoted from the closed position along a downward swing path and extends substantially horizontally to provide access to the bed of the pickup truck. In other words, the tailgate 16 pivots substantially 90 degrees between the closed position and the opened position. When the tailgate 16 is in the closed position, an outer surface **16*a* of the tailgate faces rearward of the vehicle and may be substantially vertical relative to the ground surface. When the tailgate 16 is in the opened position, the outer surface 16*a* faces downward toward the ground surface and may be substantially parallel to the ground surface. Optionally, the tailgate 16 may be adjustable to one or more intermediate positions between the closed position and the opened position, such as a middle position where the tailgate 16** is at a substantially 45 degree angle relative to the bed of the vehicle.

The rearward viewing camera 14 is disposed at the tailgate 16 at a position along the outer surface 16*a* of the tailgate 16 and is movable with the tailgate 16 when the tailgate 16 is moved between the closed position and the opened position. For example, the rearward viewing camera 14 may be integrated with a camera module mounted at the tailgate 16. In the illustrated example, the camera 14 is integrated with a tailgate handle module 18 that operable to release a latch mechanism of the tailgate 16 when the handle module 18 is grasped by a user to move the tailgate 16 from the closed position to the opened position. For example, the tailgate handle module may include characteristics of the handle modules described in U.S. Pat. No. 10,800,320, which is hereby incorporated herein by reference in its entirety.

When the tailgate 16 is in the closed position, the camera 14 is oriented relative to the tailgate 16 to view rearward of the vehicle, such that the camera may capture image data to display rear backup images to a driver of the vehicle. That is, the camera 14 may view at least rearward and downward of the vehicle.

Traditional rear backup cameras at the tailgates of pickup trucks are fixedly mounted relative to the tailgate and thus the view of the camera changes according to movement of the tailgate. For example, a traditional rear backup camera may view rearward of the vehicle when the tailgate is in the closed position and may view toward the ground when the tailgate is in the opened position. In other words, a principal viewing axis of a traditional rear backup camera may be fixed relative to the tailgate and thus move or pivot relative to the vehicle and the ground surface as the tailgate is moved between the closed position and the opened position. Thus, images captured by a traditional rear backup camera may only be useful (e.g., to provide rear backup images that are representative of the region exterior and rearward of the vehicle) when the tailgate is in the closed position. However, the vehicle may often be operated with the tailgate down or in the opened position, such as when the vehicle is hauling lumber, drywall, mulch, and other situations where the load is too long to close the tailgate or access to the bed is required. Thus, use of the camera (e.g., to provide rear backup images that are representative of the region exterior and rearward of the vehicle) would be helpful to the driver in backing up the vehicle with the tailgate down, but the current execution for pickup truck tailgate cameras does not allow for an effective use of the camera when the tailgate is lowered.

Figure 2:
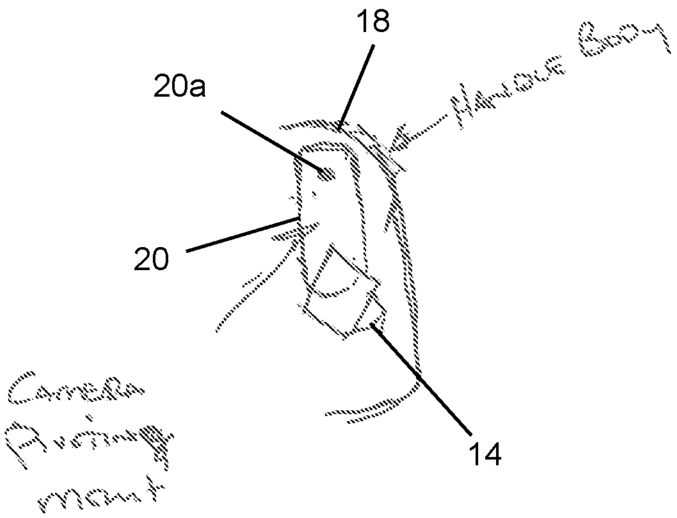
FIG. 2 is a sectional view of the handle module at the tailgate of the vehicle, with a camera integrated with the handle module and pivotable relative to the handle module according to movement of the tailgate between a closed position and an opened position.

As shown in FIG. 2, the camera 14 is pivotably mounted to the handle module 18 so that the camera 14 pivots relative to the handle module 18 and the tailgate 16 when the tailgate 16 is moved between the closed position and the opened position. In other words, the camera mount changes position with the tailgate. The camera 14 pivots relative to the tailgate 16 so that the camera 14 views rearward (and optionally downward) of the vehicle when the tailgate 16 is in the opened position and when the tailgate 16 is in the closed position. In other words, image data captured by the camera 14 may be suitable to provide rear backup images to the driver both when the tailgate 16 is in the closed position and when the tailgate 16 is in the opened position.

Furthermore, the camera 14 may pivot relative to the tailgate 16 such that the viewing angle of the principal viewing axis of the camera 14 (e.g., a vector extending from an imager plane of the camera and along the lens or lens barrel of the camera) relative to the ground surface may remain substantially constant throughout a range of motion of the tailgate 16. That is, as the tailgate 16 pivots between the closed position and the opened position, the camera 14 pivots relative to the tailgate 16 and/or handle module 18 to maintain a viewing angle of the camera 14 relative to the ground surface. Thus, the camera 18 pivots relative to the tailgate 16 so that the vision system may provide rear backup images to the driver of the vehicle when the tailgate 16 is in the opened position, the closed position, and any pivot position between the closed position and the opened position (i.e., a partially opened or a partially closed position). In other words, the camera mount may change positions with the tailgate between the closed position (up position) and the opened position (down position) and the design may accommodate the full range of motion of the tailgate.

The camera 14 may be attached to or mounted at a camera pivot mount 20 that pivots relative to the handle body 18 (that is fixed relative to the tailgate 16) to adjust the pivot position of the camera 14 relative to the handle 18 and the tailgate 16. For example, a pivot pin 20*a* may be attached at the handle body 18 and extend through the camera pivot mount 20 and/or camera 14 to enable pivoting relative to the handle body 18.

The camera 14 may be manually pivotable relative to the handle body 18, such that a user may manipulate and pivot the camera 14 relative to the handle 18 and tailgate 16 so that the camera 14 provides a desired field of view. For example, with the tailgate in the closed position and the camera 14 viewing rearward of the vehicle and before or while lowering the tailgate 16, the user may pivot the camera 14 so that, with the tailgate in the opened position, the camera views rearward of the vehicle. Thus, when the camera 14 is pivoted, the camera 14 may be locked at a pivot position relative to the tailgate 16 to maintain the pivoted angle of the camera relative to the tailgate throughout the range of motion of the tailgate. That is, the camera may be pivoted to a desired angle relative to the tailgate when the camera 14 is more accessible to the user with the tailgate in the closed position so that, when the tailgate is then opened and the camera 14 is less accessible to the user, the camera maintains its angle relative to the tailgate and provides the desired viewing angle with the tailgate in the opened position.

The camera 14 may be automatically pivotable relative to the handle body 18, such that in response to the tailgate being moved between the closed position and the opened position, the camera 14 pivots relative to the tailgate 16. For example, the camera 14 and/or the camera pivot mount 20 may include a weight or mass or biasing arm that biases the position of the camera 14 responsive to gravity and change of position of the tailgate 16 so that the position of the camera 14 changes as the position of the tailgate 16 changes. The biasing mass may maintain the camera 14 in a level position relative to the ground surface. That is, as the tailgate 16 is moved between the closed position and the opened position, a weighted end of the pivot mount 20 (e.g., the camera 14 at the pivot mount 20 or the weight at the pivot mount 20) causes the pivot mount 20 and the camera 14 to pivot relative to the handle body 18 and maintain the camera viewing angle between the principal viewing axis and the ground surface. For example, with the tailgate 16 in the closed position, the pivot mount 20 and/or the camera 14 may be at least partially recessed into the handle body 18 and, as the tailgate 16 moves toward the opened position, the pivot mount 20 and/or the camera 14 may pivot relative to the tailgate 16 and hang or extend at least partially from the handle body 18.

In some examples, the camera 14 may have a different viewing angle between the principal viewing axis and the ground surface when the tailgate 16 is in the closed position as compared to when the tailgate 16 is in the opened position. For example, because the camera 14 may be at a greater height relative to the ground surface when the tailgate 16 is in the closed position than when the tailgate 16 is in the opened position, the camera 14 may be pointed further downward with the tailgate 16 in the closed position than with the tailgate 16 in the opened position. That is, the viewing angle of the camera 14 between the principal viewing axis and the ground surface may be greater with the tailgate 16 in the closed position than with the tailgate 16 in the opened position. This may result in the scenes viewed by the camera 14 being substantially similar between having the tailgate 16 in the closed position and the opened position.

Optionally, an electrically operable actuator may be operable to adjust a position of the camera 14 and/or the camera pivot mount 20 relative to the handle 18 and/or the tailgate 16 to adjust the viewing angle of the camera 14 relative to the tailgate 16. The actuator may adjust the position of the camera 14 in response to a user input, such as a user input at the interior portion of the vehicle (e.g., at the display screen). For example, the actuator may adjust the position of the camera 14 responsive to a user input to release the tailgate and/or move the tailgate between the closed position and the opened position. Thus, the actuator moves the camera 14 between positions automatically upon opening or closing of the tailgate.

The actuator may adjust the camera between two preset positions relative to the handle 18 and/or tailgate 16 that correspond respectively to the opened and closed positions of the tailgate 16. Optionally, the camera 14 may be adjustable to a plurality of discrete positions via operation of the actuator based on the user input, such that the user may adjust the position of the camera to provide a desired field of view.

As the tailgate 16 pivots between the closed position and the opened position and the camera 14 pivots relative to the tailgate to maintain the viewing angle of the camera 14, the camera 14 may pivot between a plurality of predefined pivot positions. For example, a detent mechanism may retain the camera 14 in the plurality of predefined pivot positions to maintain one of a plurality of predefined viewing angles of the camera 14 corresponding to the predefined pivot positions. That is, the detent mechanism may maintain the camera 14 in the predefined pivot position at the set angle of the tailgate, such as to resist movement of the camera 14 as the vehicle travels along the road. The actuator may adjust the camera 14 from the predefined pivot position to adjust the viewing angle of the camera.

Thus, the pivot action of the camera 14 may be manual, electrically actuated, and/or mechanically driven by a pivoting weighted system that maintains the orientation of the camera to the ground plane or to the plane of the vehicle. With the tailgate 16 in the closed position, the camera 14 may have a first viewing or visual angle relative to the tailgate (e.g., an angle between a longitudinal axis of the tailgate and a vector extending from an imaging plane of the camera and along the lens barrel) (e.g., an acute angle or a right angle), and with the tailgate in the opened position, the camera 14 may have a second viewing angle relative to the tailgate (e.g., an obtuse angle) to accommodate pivoting of the tailgate. Optionally, the viewing angle of the camera 14 relative to the ground surface may be substantially the same (e.g., within 10 degrees or within 5 degrees or thereabouts) with the tailgate 16 in the closed position and in the opened position.

Further, the camera may be pivotably adjusted based on the rearward field of view provided by the camera 14, such as based on a length of the load extending from the bed of the pickup truck. For example, if the tailgate 16 is in the opened position, but no load is extending from the bed, the camera 14 may be adjusted so that the images displayed to the driver of the vehicle include the edge of the tailgate 16 and the area rearward and downward of the vehicle. If the tailgate 16 is in the opened position and the load extends from the bed, the camera 14 may be adjusted so that the images displayed to the driver of the vehicle include the edge of the load extending from the bed and the area rearward and downward of the vehicle so that the driver may be more readily aware of the end of the load extending from the bed when reversing the vehicle. In other words, the camera 14 may be adjusted based on the furthest one of the vehicle or load rearward of the vehicle so that the vehicle or load may be viewed in the displayed video images. For example, the tailgate 16 may be in the closed position and a load (e.g., a wooden board) may extend from the bed of the vehicle rearward and above the upper edge of the tailgate 16. Based on detecting the load extending rearward and above the tailgate, the camera 14 may be adjusted (e.g., pivoted or tilted upward) to include the furthest end of the load in the displayed video images.

As discussed above, the camera 14 may be manually adjusted or mechanically adjusted (e.g., via an actuator) to adjust the rearward field of view. Optionally, the camera 14 may be adjusted mechanically based on the image data captured by the camera. For example, the captured image data may be processed to detect whether the load is extending from the bed of the pickup truck and to determine an end of the load extending from the bed of the truck so that the position of the camera may be pivotably adjusted based on the determined end of the load extending from the bed of the truck.

Optionally, the actuator may adjust the position of the camera 14 based on the captured image data and the user input. For example, a user input may request that the vision system adjust the field of view provided by the camera based on an end of the load in the bed of the pickup truck (e.g., adjust the field of view such that the end of the load furthest from the vehicle is included in the images displayed to the driver), and the system may adjust the camera to detect the load extending from the tailgate and set the position of the camera based on the determined end of the load. Optionally, a user input may request that the vision system adjust the field of view to correct an angle of the camera relative to the tailgate (e.g., adjust the field of view such that the camera is level relative to the ground surface) and the system may adjust the position of the camera 14, for example based on a detected horizon in the captured image data or based on a level sensor at the camera 14 or handle module 18 or vehicle.

Optionally, the system adjusts the camera 14 relative to the tailgate based on the opening angle or position of the tailgate 16 between the closed position and the opened position, such that the camera is adjusted to provide substantially the same viewing angle (e.g., within about 5 degrees or 10 degrees or the like) between the principal viewing axis of the camera and the ground surface at any position of the tailgate between the closed position and the opened position. Furthermore, the camera may be adjusted based on the opening angle or position of the tailgate and based on detection of an object rearward of the vehicle so that the camera is adjusted to have the object at about the same location in the field of view of the camera regardless of the position that the tailgate is in. For example, an object may be detected in the field of view of the camera and the camera may be adjusted to position the object at or near the central region of the field of view (so that the object may be at the central region of the video images displayed to the driver of the vehicle) so that the driver may more readily recognize the object in the backup images. If the system determines that the object is extending from the bed of the vehicle, the system may adjust the camera to position the object at or near the upper edge or region of the field of view of the camera so that the object may be at the upper edge or region of the video images displayed to the driver of the vehicle. Optionally, the camera may have a baseline or initial set position when the tailgate is closed (as it would normally be during operation of the vehicle). If the camera determines an object rearward of the vehicle when the tailgate is closed, and the tailgate is then open, the camera may be adjusted so that the detected object is at approximately the same location in the field of view of the camera as it was when the tailgate was closed, thus setting the camera's rearward view at a similar viewing angle and direction as the initial set position.

Thus, the vision system includes the camera disposed at the tailgate of the vehicle and viewing rearward of the vehicle. The ECU receives image data captured by the camera and generates video images (e.g., rear backup images) for display to the driver of the vehicle at a display screen of the vehicle. The tailgate pivots between a closed position and an opened position along a downward swing path. When the tailgate is pivoted between the closed position and the opened position, the camera pivots relative to the tailgate to adjust a visual angle of the camera relative to the tailgate so that the camera views rearward of the vehicle when the tailgate is in the closed position and when the tailgate is in the opened position.

Optionally, the vision system may provide a trailer maneuvering or assist system that operates to capture images exterior of the vehicle and at least partially including a trailer being towed by the vehicle and the system may process the captured image data to determine a path of travel for the vehicle and trailer, such as to assist a driver of the vehicle in maneuvering the vehicle and trailer in a rearward direction. For example, when the tailgate is lowered to the opened position and the camera is adjusted to adjust the field of view of the camera, the camera may be pivoted based on a position within the captured image data of the trailer and/or a hitch ball mounted to a hitch receiver of the vehicle. That is the camera may be adjusted so that the camera at least partially views the trailer and/or the hitch of the vehicle.

Optionally, the pivotable camera module may be suitable for use on other types of rear doors of vehicles, such as a liftgate or the like, where the camera module may pivot (in a similar manner as described above) as the liftgate is pivoted between its lowered or closed position and its raised or opened position at the rear of the vehicle. The camera module may be configured to provide a field of view that is at least downward and rearward when the liftgate is opened so as to view at least the area below and rearward of the liftgate so a user can see behind the rear of the vehicle, and may pivot to maintain at least a rearward field of view (such as for a rear backup camera) when the liftgate is closed. For example, the camera may be positioned at a handle module at the liftgate and/or at or along a lower edge of the liftgate.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095;

US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2022-0028111; US-2022-0027644; US-2022-0024391; US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2018-0276838; US-2018-0215382; US-2017-0254873; US-2017-0217372 and/or US-2015-0002670, and/or International Publication No. WO 2021/0127693, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed at a tailgate of a vehicle equipped with the vehicular vision system, wherein the camera views rearward of the vehicle;

wherein the camera is operable to capture image data;

wherein the camera comprises a CMOS imaging sensor, and wherein the CMOS imaging sensor comprises at least one million photosensors arranged in rows and columns;

an electronic control unit (ECU);

wherein image data captured by the camera is transferred to the ECU;

wherein the ECU comprises electronic circuitry and associated software, and wherein the electronic circuitry of the ECU comprises an image processor operable to process image data captured by the camera and transferred to the ECU;

wherein the vehicular vision system, via processing at the ECU of image data captured by the camera, generates video images, and wherein the generated video images are displayed at a display device at an interior portion of the vehicle for viewing by a driver of the vehicle;

wherein the tailgate is pivotable between (i) a closed position, where the tailgate is upright and closes access to a compartment of the vehicle, and (ii) an opened position, where the tailgate is pivoted along a downward swing path from the closed position to allow access to the compartment of the vehicle;

wherein, when the tailgate is in the closed position, the camera views rearward of the vehicle;

an actuator that is electrically operable to pivot the camera relative to the tailgate;

wherein the vehicular vision system, based on processing at the ECU of image data captured by the camera, controls the actuator to pivot the camera relative to the tailgate to adjust a rearward view of the camera; and wherein the vehicular vision system (i) detects, based on processing at the ECU of image data captured by the camera, an object extending from a bed of the vehicle and (ii) controls the actuator to pivot the camera relative to the tailgate until the vehicular vision system determines, via processing at the ECU of image data captured by the camera, that an end of the detected object is represented in the video images displayed at the display device and viewable by the driver of the vehicle.

2. The vehicular vision system of claim 1, wherein, when the tailgate is in the closed position, a principal viewing axis of the camera relative to the tailgate comprises a first angle, and, when the tailgate is in the opened position, the principal viewing axis of the camera relative to the tailgate comprises a second angle, and wherein the second angle is greater than the first angle.

3. The vehicular vision system of claim 2, wherein the first angle comprises one selected from the group consisting of (i) an acute angle and (ii) a right angle, and wherein the second angle comprises an obtuse angle.

4. The vehicular vision system of claim 2, wherein an angle of the principal viewing axis of the camera relative to a ground surface when the tailgate is in the closed position is within 10 degrees of an angle of the principal viewing axis of the camera relative to the ground surface when the tailgate is in the opened position.

5. The vehicular vision system of claim 1, wherein the camera is disposed at a handle module of the tailgate, and wherein the camera pivots relative to the handle module when the tailgate is pivoted between the closed position and the opened position.

6. The vehicular vision system of claim 1, wherein the camera is fixed relative to a pivot module that is pivotably mounted at the tailgate, and wherein the pivot module pivots relative to the tailgate when the tailgate is pivoted between the closed position and the opened position.

7. The vehicular vision system of claim 6, wherein the pivot module comprises a weighted arm that pivots relative to the tailgate due to gravitational forces at the weighted arm as the tailgate is pivoted between the closed position and the opened position.

8. The vehicular vision system of claim 1, wherein the vehicular vision system, based on determination that the tailgate has been pivoted between the closed position and the opened position, controls the actuator to pivot the camera relative to the tailgate to maintain the rearward view of the camera.

9. The vehicular vision system of claim 1, wherein the vehicular vision system, based on a user input, controls the actuator to pivot the camera relative to the tailgate to adjust a principal viewing axis of the camera relative to the tailgate.

10. The vehicular vision system of claim 1, wherein the camera, when the tailgate is pivoted between the closed position and the opened position, pivots relative to the tailgate between respective ones of a plurality of predefined pivot positions to adjust a principal viewing axis of the camera relative to the tailgate to corresponding respective ones of a plurality of predefined angles of the principal viewing axis of the camera relative to the tailgate.

11. The vehicular vision system of claim 10, wherein the actuator is electrically operable to pivot the camera relative to the tailgate between respective ones of the plurality of predefined pivot positions.

12. The vehicular vision system of claim 1, wherein the camera is manually pivotable relative to the tailgate to manually adjust a principal viewing axis of the camera relative to the tailgate.

13. The vehicular vision system of claim 1, wherein the vehicle comprises a pickup truck.

14. The vehicular vision system of claim 1, wherein, when the tailgate is pivoted to the opened position, the camera pivots relative to the tailgate to view rearward of the vehicle with the tailgate in the opened position.

15. A vehicular vision system, the vehicular vision system comprising:

a camera disposed at a tailgate of a vehicle equipped with the vehicular vision system, wherein the camera views rearward of the vehicle;

wherein the camera is disposed at a handle module of the tailgate;

wherein the camera is operable to capture image data;

wherein the camera comprises a CMOS imaging sensor, and wherein the CMOS imaging sensor comprises at least one million photosensors arranged in rows and columns;

an electronic control unit (ECU);

wherein image data captured by the camera is transferred to the ECU;

wherein the ECU comprises electronic circuitry and associated software, and wherein the electronic circuitry of the ECU comprises an image processor operable to process image data captured by the camera and transferred to the ECU;

wherein the vehicular vision system, via processing at the ECU of image data captured by the camera, generates video images, and wherein the generated video images are displayed at a display device at an interior portion of the vehicle for viewing by a driver of the vehicle;

wherein the tailgate is pivotable between (i) a closed position, where the tailgate is upright and closes access to a compartment of the vehicle, and (ii) an opened position, where the tailgate is pivoted along a downward swing path from the closed position to allow access to the compartment of the vehicle;

wherein, when the tailgate is in the closed position, the camera views rearward of the vehicle, and wherein, when the tailgate is pivoted to the opened position, the camera pivots relative to the handle module of the tailgate to view rearward of the vehicle with the tailgate in the opened position;

wherein, when the tailgate is in the closed position, a principal viewing axis of the camera relative to the tailgate comprises a first angle, and, when the tailgate is in the opened position, the principal viewing axis of the camera relative to the tailgate comprises a second angle, and wherein the second angle is greater than the first angle;

an actuator that is electrically operable to pivot the camera relative to the handle module of the tailgate;

wherein the vehicular vision system, based on processing at the ECU of image data captured by the camera, controls the actuator to pivot the camera relative to the handle module of the tailgate to adjust a rearward view of the camera; and wherein the vehicular vision system (i) detects, based on processing at the ECU of image data captured by the camera, an object extending from a bed of the vehicle and (ii) controls the actuator to pivot the camera relative to the tailgate until the vehicular vision system determines, via processing at the ECU of image data captured by the camera, that an end of the detected object is represented in the video images displayed at the display device and viewable by the driver of the vehicle.

16. The vehicular vision system of claim 15, wherein an angle of the principal viewing axis of the camera relative to a ground surface when the tailgate is in the closed position is within 10 degrees of an angle of the principal viewing axis of the camera relative to the ground surface when the tailgate is in the opened position.

17. The vehicular vision system of claim 15, wherein the vehicular vision system, based on determination that the tailgate has been pivoted between the closed position and the opened position, controls the actuator to pivot the camera relative to the handle module of the tailgate to maintain the rearward view of the camera.

18. The vehicular vision system of claim 15, wherein the vehicular vision system, based on a user input, controls the actuator to pivot the camera relative to the handle module of the tailgate to adjust the principal viewing axis of the camera relative to the tailgate.

19. The vehicular vision system of claim 15, wherein the camera, when the tailgate is pivoted between the closed position and the opened position, pivots relative to the handle module of the tailgate between respective ones of a plurality of predefined pivot positions to adjust a principal viewing axis of the camera relative to the tailgate to corresponding respective ones of a plurality of predefined angles of the principal viewing axis of the camera relative to the tailgate.

20. The vehicular vision system of claim 15, wherein the camera is manually pivotable relative to the handle module of the tailgate to manually adjust the principal viewing axis of the camera relative to the tailgate.

21. A vehicular vision system, the vehicular vision system comprising:

a camera disposed at a tailgate of a vehicle equipped with the vehicular vision system, wherein the camera views rearward of the vehicle;

wherein the camera is operable to capture image data;

wherein the camera comprises a CMOS imaging sensor, and wherein the CMOS imaging sensor comprises at least one million photosensors arranged in rows and columns;

an electronic control unit (ECU);

wherein image data captured by the camera is transferred to the ECU;

wherein the ECU comprises electronic circuitry and associated software, and wherein the electronic circuitry of the ECU comprises an image processor operable to process image data captured by the camera and transferred to the ECU;

wherein the vehicular vision system, via processing at the ECU of image data captured by the camera, generates video images, and wherein the generated video images are displayed at a display device at an interior portion of the vehicle for viewing by a driver of the vehicle;

wherein the tailgate is pivotable between (i) a closed position, where the tailgate is upright and closes access to a compartment of the vehicle, and (ii) an opened position, where the tailgate is pivoted along a downward swing path from the closed position to allow access to the compartment of the vehicle;

wherein, when the tailgate is in the closed position, the camera views rearward of the vehicle;

an actuator that is electrically operable to pivot the camera relative to the tailgate;

wherein the vehicular vision system, based on a user input, controls the actuator to pivot the camera relative to the tailgate to adjust a principal viewing axis of the camera relative to the tailgate;

wherein the vehicular vision system, based on processing at the ECU of image data captured by the camera, controls the actuator to pivot the camera relative to the tailgate to adjust a rearward view of the camera; and wherein the vehicular vision system (i) detects, based on processing at the ECU of image data captured by the camera, an object extending from a bed of the vehicle and (ii) controls the actuator to pivot the camera relative to the tailgate until the vehicular vision system determines, via processing at the ECU of image data captured by the camera, that an end of the detected object is represented in the video images displayed at the display device and viewable by the driver of the vehicle.

22. The vehicular vision system of claim 21, wherein, when the tailgate is in the closed position, the principal viewing axis of the camera relative to the tailgate comprises a first angle, and, when the tailgate is in the opened position, the principal viewing axis of the camera relative to the tailgate comprises a second angle, and wherein the second angle is greater than the first angle.

23. The vehicular vision system of claim 22, wherein an angle of the principal viewing axis of the camera relative to a ground surface when the tailgate is in the closed position is within 10 degrees of an angle of the principal viewing axis of the camera relative to the ground surface when the tailgate is in the opened position.

24. The vehicular vision system of claim 21, wherein the vehicular vision system, based on determination that the tailgate has been pivoted between the closed position and the opened position, controls the actuator to pivot the camera relative to the tailgate to maintain the rearward view of the camera.

25. The vehicular vision system of claim 21, wherein, when the tailgate is pivoted to the opened position, the camera pivots relative to the tailgate to view rearward of the vehicle with the tailgate in the opened position.

* * * * *